United States Patent [19]

Ball

[11] 4,068,488
[45] Jan. 17, 1978

[54] METHOD OF BACKFILLING PIPELINE TRENCHES

[75] Inventor: D. Graham Ball, North Vancouver, Canada

[73] Assignee: Rader Companies, Inc., Portland, Oreg.

[21] Appl. No.: 573,021

[22] Filed: Apr. 30, 1975

[51] Int. Cl.² ............................................. F16L 1/00
[52] U.S. Cl. ................................. 61/105; 37/142.5; 61/63; 138/105
[58] Field of Search ............... 61/72.1, 72.4, 72.3, 61/72.5; 248/54; 138/105; 302/17, 28, 63; 214/1 PA; 37/142.5

[56] References Cited

U.S. PATENT DOCUMENTS

| | | | |
|---|---|---|---|
| 1,792,855 | 2/1931 | McRae | 138/105 X |
| 2,602,410 | 7/1952 | Vaughn | 61/72.1 |
| 2,947,096 | 8/1960 | Cummings et al. | 37/142.5 |
| 2,987,891 | 6/1961 | Phillips | 61/72.1 |
| 3,186,769 | 6/1965 | Howlett | 302/17 |
| 3,267,682 | 8/1966 | Robley | 61/72.3 |
| 3,292,379 | 12/1966 | McElvany | 61/72.5 |
| 3,563,825 | 2/1971 | Segura et al. | 138/105 UX |
| 3,568,455 | 3/1971 | McLaughlin et al. | 138/105 X |
| 3,626,702 | 12/1971 | Monahan | 61/72.1 X |
| 3,655,564 | 4/1972 | Barrington | 61/72.1 X |
| 3,656,309 | 4/1972 | Buitema | 61/72.3 X |
| 3,664,137 | 5/1972 | Lett | 61/72.1 X |
| 3,673,808 | 7/1972 | Volbeda | 61/72.4 |
| 3,688,510 | 9/1972 | Keating | 61/72.3 |
| 3,722,225 | 3/1973 | Empson | 61/72.1 |
| 3,861,158 | 1/1975 | Swain et al. | 61/72.1 |

Primary Examiner—Dennis L. Taylor
Attorney, Agent, or Firm—Klarquist, Sparkman, Campbell, Leigh, Hall & Whinston

[57] ABSTRACT

A trench containing a pipeline is backfilled by temporarily supporting the pipeline at grade in the trench on deflatable airbags spaced along the bottom of the trench. The trench is then backfilled below and around the pipe by pneumatically blowing a granular fill material into the trench first beneath the pipe and then progressively upwardly about its opposite sides to about its spring line so as simultaneously to backfill the trench and uniformly compact the fill material about the pipe without leaving any voids. The fill material is blown into the trench through a pair of opposed air ducts with upturned lower outlet ends extending into the trench on opposite sides of the pipe so that backfilling progresses upwardly on opposite sides of the pipe simultaneously. As backfilling operation progresses along the trench and approaches each support pad, the pad is deflated and removed so that the operation can proceed uninterruptedly. After the trench is pneumatically backfilled to the spring line of the pipe in the aforesaid manner, the upper portion of the trench to the soil surface can be backfilled in a conventional manner.

12 Claims, 4 Drawing Figures

FIG. 1 PRIOR ART
FIG. 2
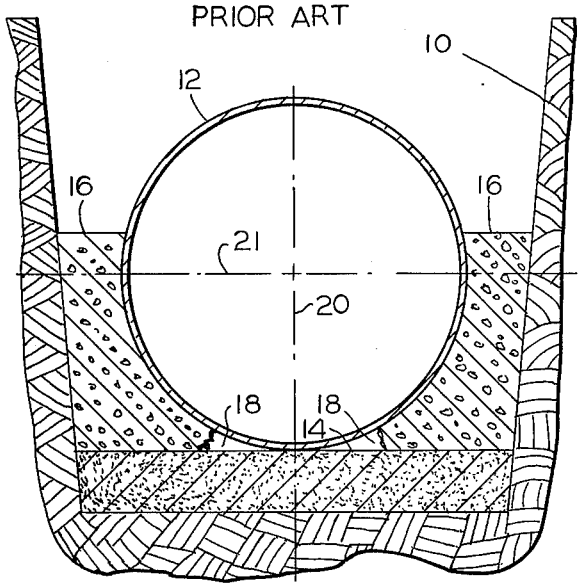
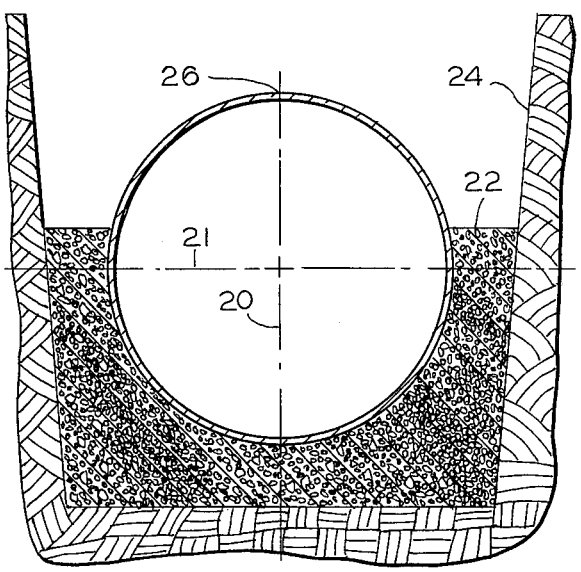
FIG. 3
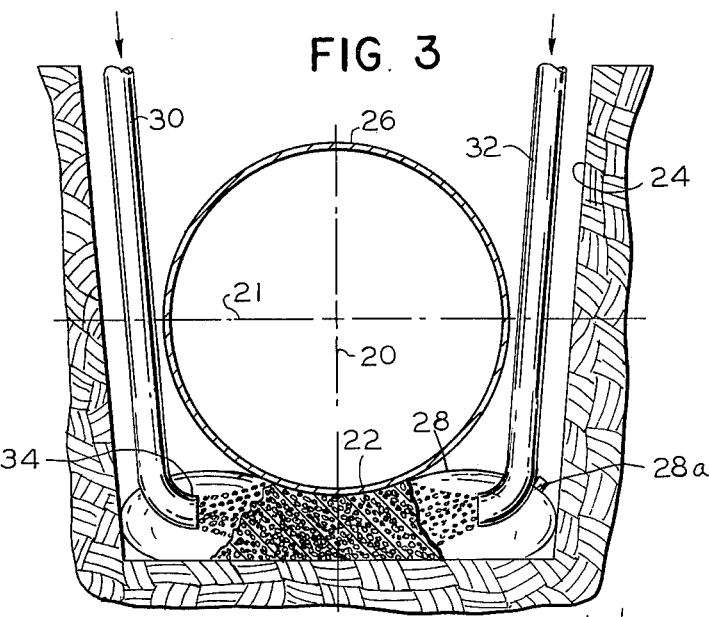
FIG. 4
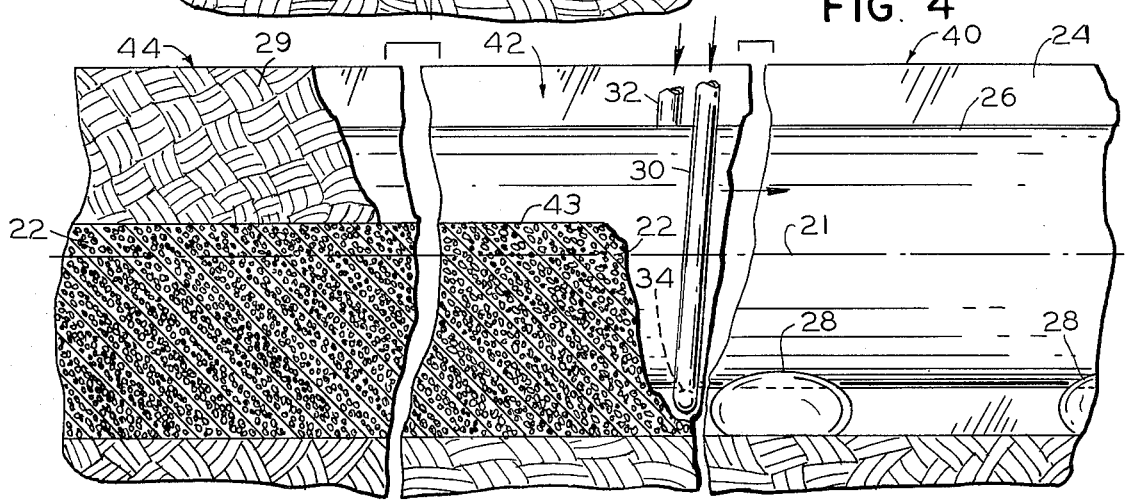

METHOD OF BACKFILLING PIPELINE TRENCHES

BACKGROUND OF THE INVENTION

1. Field of the Invention

The present invention relates to a method of backfilling pipeline trenches.

2. Description of the Prior Art

According to the most conventional method of backfilling a pipeline trench, the bottom of the trench is first filled with a layer of sand or other bedding material which is then compacted to form a bed for the pipe. The pipe is then laid on this bed after which an aggregate padding material is dumped into the trench along the opposite sides of the pipe. Tampers and vibrators are use to compact the padding about the pipe to secure the pipe in its final position. However, it is difficult to obtain effective compaction of the padding in a region along the bottom of the pipe adjacent to its centerline at the interface of the bedding and padding materials. Quite often air voids remain in this region or at best it is left with only loosely compacted material, thereby creating a flow path for water that may trickle or otherwise find its way into the trench. Where the pipeline is laid on a gradient, which is common, a sufficient flow in the indicated region occurs to eventually wash away the bedding material from beneath the pipe, causing it to settle and finally rupture. Depending on the pipeline's location and the material transported, the possibility of such rupture can present a serious risk of damage to the environment, wildlife and human populations, and substantial loss of the transported resource.

Accordingly, there is a need for an improved method of backfilling pipeline trenches to avoid the aforementioned problems and risks presented by conventional backfilling methods.

SUMMARY OF THE INVENTION

The present invention is an improved method of backfilling pipeline trenches to minimize the possibility of pipeline settling and rupture, even under the severest of soil and climate conditions.

The method of the invention utilizes air under pressure to blow a granular fill material into the pipeline trench first below the pipe and then progressively upwardly about opposite sides of the pipe to at least about its spring line simultaneously to fill the trench and uniformly compact the fill material about the pipe. During the pneumatic backfilling operation, the pipeline is temporarily supported at grade in the trench on a series of removable support pads. As the pneumatic filling operation approaches each pad to a point where the pipe can be supported by previously deposited fill, the pad is removed from beneath the pipe so that the filling operation can proceed along the trench. Preferably the trench is backfilled by blowing the fill material primarily horizontally into the trench beneath the pipe and upwardly along its opposite sides using a pair of opposed vertical air ducts with 90° elbows at their discharge ends projecting into the trench on opposite sides of the pipe. The removable pads are preferably gas-filled and deflatable to facilitate their removal from beneath the pipe.

A primary objective of the invention is to provide a method of backfilling pipeline trenches that will prevent the washout of bedding material from beneath the pipeline and consequential pipeline rupture.

Another primary objective is to provide a method of backfilling pipeline trenches that will provide uniform optimum compaction of the fill material beneath, about and against the pipe from the bottom of the trench upwardly to eliminate air voids and areas of loose fill and to enable the use of thin-walled pipe sections.

Another important object is to provide a method of backfilling pipeline trenches that is safer, faster, easier and more economical than prior such methods.

The foregoing and other objects, features, and advantages of the present invention will become more apparent from the following detailed description which proceeds with reference to the accompanying drawing.

BRIEF DESCRIPTION OF THE DRAWING

In the drawing:

FIG. 1 is a cross-sectional view through a pipeline trench illustrating the prior conventional backfilling method of the prior art;

FIg. 2 is a cross-sectional view similar to FIG. 1, showing a pipeline trench backfilled in accordance with the present invention;

FIG. 3 is a cross-sectional view through a pipeline trench illustrating the method of backfilling according to the invention; and FIG. 4 is a longitudinal sectional view through a pipeline trench illustrating the progressive steps of backfilling in accordance with the invention.

DETAILED DESCRIPTION

First, with reference to FIG. 1, a trench 10 contains a pipe 12 with the trench having been filled in accordance with a conventional back-filling method of the prior art. In accordance with such method, a bedding layer 14 of sand, gravel or other mineral aggregate is placed in the bottom of the trench and compacted by tampers and vibrators to the desired grade of pipe 12. The pipe 12 is then laid on bed 14, which supports the pipe at grade. Then a padding material 16, usually also a mineral aggregate, is deposited in the trench on opposite sides of pipe 12. Conventional tampers and vibrators are applied to the padding material 16 as it is fed into the trench in an effort to compact it securely about the pipe to secure it permanently in its final position. However, it is difficult to compact the padding material securely in the regions 18 at the interface of bed 14 and padding 16 adjacent to and on opposite sides of the vertical centerline 20 of the pipe because of the geometry and location of such region. As a result, frequently region 18 contains an air void or loosely compacted fill which provides a collection point for water seeping or otherwise finding its way into the trench. If the pipeline is laid on a gradient, regions 18 provide a flowpath for such water. Over a period of time water flowing along these regions will wash away bedding material from beneath the pipe, causing it to settle. If the settling is severe, a rupture of the pipeline may occur.

Referring now to FIGS. 2, 3 and 4, the backfilling method of the present invention utilizes a conventional trench 24 and pipeline 26. However, pipeline 26 is temporarily supported on removable support pads 28 at grade in its final desired position spaced from the opposite sidewalls and bottom of the trench. The pads are preferably air-filled bags equipped with air valves 28a for easy inflation and deflation to facilitate their use.

Using a pair of air ducts 30, 32 projecting into the trench on opposite sides of the pipeline 26, a granular fill material 22, such as crushed rock or other suitable mineral aggregate, is blown into the trench under pneumatic pressure. First the space in the trench beneath the pipeline is filled with the granular material at a position unsupported by pads 28 as shown in FIGS. 3 and 4. Then filling progresses upwardly in the trench simultaneously on opposite sides of the pipeline by gradually withdrawing air ducts 30, 32 upwardly until the trench is filled with the granular fill material and firmly compacted about the pipeline to at least approximately the spring line 21 of pipe 26. The granular fill material from the bottom of the trench to the upper limit of compaction may have the same size composition. It has been found that mineral aggregate such as crushed rock or gravel, up to 4-inch minus in size, can be successfully blown into place and compacts well under pneumatic pressure to provide a suitable fill material.

As the pneumatic filling operation progresses along the trench and approaches one of support pads 28 so that the pipe is supported by the fill, such pad is deflated and removed from beneath the pipe so that the filling operation can continue uninterruptedly along the pipeline. Thus as the filling operation proceeds, pads 28 are deflated and removed one by one as necessary until the backfilling operation is completed and all of the pads have been removed.

After a section of trench has been backfilled pneumatically to approximately the spring line of the pipe, the remaining upper portion of the trench section is backfilled with additional fill material 29 in the conventional manner using a bulldozer or other dozer blade-equipped vehicle to push the backfill material into the trench. Thereafter such loose upper fill is compacted using conventional compaction vehicles and equipment.

The pair of air ducts 30, 32 used to blow the granular material into the trench under pressure are connected to an above-surface source of air pressure and supply of aggregate fill material (not shown). The aggregate can be fed from a hopper into the air ducts using a conventional impeller-type feeder with built-in air lock feature as manufactured, for example, by Rader Pneumatics, Inc., of Portland, ORE. Such ducts are preferably capable of moving not only vertically and longitudinally within the trench, but also about their generally vertical axes so that their lower outlet ends 34, which are upturned slightly, can direct the granular fill material beneath the pipeline and in other directions as required along the sides of the pipe and trench.

By pneumatically blowing the granular fill material into the trench beneath the pipeline and working gradually upwardly simultaneously about both sides of the pipe, the air voids and areas of loose fill described with respect to the conventional method of FIG. 1 are avoided. Also, the method provides a uniform all-around external aggregate contact pressure on the buried portion of the pipe to counteract internal pressures on the pipe from the material flowing therethrough. This enables the use of pipe of thinner wall section than would normally be required using conventional backfilling methods. From experimentation it has been found preferable to blow the fill material into the trench generally horizontally. This simplifies the blowing of material beneath and along the pipe and against the sides and previously filled section of the trench. It also provides optimum compaction. For this reason the upturned lower discharge ends 34 of air ducts 30, 32 are preferably formed with a 90° elbow. Backfilling a section begins with the elbow at the bottom of the trench spraying material beneath the pipe and against the wall of previously backfilled material. In this sense the fill material is blown into the trench generally in a direction opposite the direction in which backfilling progresses, as shown in FIG. 4. The elbow 34 is gradually raised as the bottom of the trench is filled, blowing material from side to side and toward the rear of the trench in the process.

In FIG. 4 the steps of the method are illustrated in sequence, progressing from right to left. In the section 40 of trench 24, the subsurface pipeline 26 is temporarily supported at grade on inflatable support pads 28. In section 42 of the trench immediately to the left of section 40, the air ducts 30, 32 are shown in the process of pneumatically backfilling the lower portion of the trench where the pads have been removed. In this section pneumatic backfilling continues upwardly to a level 43 just above spring line 21 of the pipe. In a third section 44 of the trench to the left of section 42, the upper portion of the trench has been backfilled with fill material 29 and compacted to the soil surface using conventional compaction equipment, burying the pipe and completing the backfilling operation.

In one test backfilling operation, ¾-inch minus aggregate was used to backfill a trench for a pipe 4 feet in diameter. The pipe was supported on pads at 20-foot intervals in the trench with at least 6 inches of clearance between the pipe and the sides and bottom of the trench. A low-pressure pneumatic system developing pressures of less than 20 pounds per square inch was used to blow the material horizontally into the trench at a velocity of about 100 feet per second. Filling proceeded upwardly to the spring line of the pipe. Substantially uniform compaction was achieved with Proctor densities of the resultant fill being 95 percent or more. It is believed that by using velocities of greater than 88 feet per second, Proctor densities of greater than 90 percent can be consistently achieved.

Having illustrated and described the method of the invention in what is now its preferred embodiment, variations and modifications in the details, procedures, materials and techniques of such method will become apparent to persons skilled in the art. I intend to claim as my invention all such variations and modifications as come within the true spirit and scope of the following claims.

I claim:

1. A method of backfilling a trench containing a pipeline comprising:

temporarily supporting said pipeline at a desired final position and grade within said trench spaced from the opposite sides of said trench and spaced above the bottom of the trench on removable support pads spaced at intervals along the bottom of said trench, at a portion of said pipeline unsupported by said support pads blowing under pneumatic pressure a granular fill material into said trench first below and into the space beneath and about said pipeline and then progressively upwardly about and along the opposite sides of said pipeline to fill the trench spaces about the pipeline to at least about the spring line thereof, said fill material being blown at a velocity sufficient to simultaneously backfill said trench and compact said granular fill material to a substantially uniform desired final density about said pipeline to support the same at its final position and grade within said trench, whereby subsequent compaction of said fill material is not required, and continuing the aforesaid pneumatic filling operation progressively in a given direction along said trench and removing said support pads seriatim as the filling operation approaches each said pad.

2. The method of backfilling a trench containing a pipeline supported at final position and grade at intervals therealong spaced above the bottom of said trench and spaced from the opposite sides thereof, said method comprising blowing a granular fill material into said trench under pneumatic pressure first along the bottom of said trench and beneath said pipeline to fill the space between said pipeline and the bottom of said trench and then progressively upwardly along the opposite sides of said pipeline to fill the spaces between the pipeline and opposite sides of said trench, said fill material being blown at a velocity sufficient to simultaneously backfill said trench and compact said fill material about said pipeline to a substantially uniform final desired density to support said pipeline at its final position and grade and to substantially eliminate air pockets between said pipeline and said fill material, and to eliminate the need for subsequent compaction of said fill material.

3. The method of claim 2 including using deflatable gas-filled support pads for temporary support of said pipeline at grade within said trench and deflating each said pad to facilitate its removal from beneath said pipeline as said filling operation approaches said pad.

4. The method of claim 2 including pneumatically filling said trench with a granular fill material that is of substantially uniform size composition from the bottom of said trench upwardly to at least about the spring line of said pipe.

5. The method of claim 2 wherein said granular fill material blown into said trench under pneumatic pressure is three-quarter inch minus mineral aggregate.

6. The method of claim 2 including pneumatically blowing said granular fill material into said trench from below and along the opposite sides of pipeline through a vertically and longitudinally movable air duct extending into said trench and having an upturned lower outlet end rotatable about a generally upright axis for directing said granular material beneath said pipeline along the bottom of said trench.

7. The method of claim 2 wherein said material is blow into said trench and below and along pipeline in a generally horizontal air stream.

8. The method of claim 2 wherein said material is blown into said trench at velocities of at least 88 feet per second.

9. The method of backfilling a trench containing a pipeline comprising:

temporarily supporting said pipeline at a desired final position and grade within said trench on removable support pads placed at intervals along the bottom of said trench, at a portion of said pipeline unsupported by said support pads, blowing under pneumatic pressure granular fill material into said trench first beneath said pipeline and then progressively upwardly along the opposite sides of said pipeline to at least about the spring line thereof to simultaneously backfill said trench and compact said granular fill material along said pipeline, blowing said granular fill material into said trench below and about said pipeline simultaneously from opposite sides of said pipeline so that said filling operation progresses simultaneously from below said pipeline upwardly along the opposite sides thereof, and continuing the aforesaid pneumatic filling operation progressively in a given direction along said trench and removing said support pads seriatim as the filling operation approaches each said pad.

10. The method of backfilling a pipeline trench comprising the steps:

supporting a pipeline at a desired final position and grade within said trench at spaced intervals along said pipeline so as to create a substantial air space between said pipeline and the bottom of said trench except at such intervals and air spaces between the opposite sides of said pipeline and opposite sides of said trench, blowing a granular fill material into said trench under pneumatic pressure first along the bottom of said trench below said pipeline and into the space between said pipeline and the bottom of said trench and then progressively upwardly along the opposite sides of said pipeline and trench to fill the spaces between said opposite sides of said pipeline and opposite sides of said trench and simultaneously compact said fill material to a substantially uniform desired final density about the bottom and opposite sides of said pipeline to thereby substantially eliminate air pockets within said fill material and between said fill material and said pipeline, and eliminate the need for subsequent compaction of such fill material, and blowing said fill material in the aforesaid manner simultaneously from opposite sides of said pipeline so that said filling operation progresses simultaneously from beneath and below said pipeline upwardly along the opposite sides thereof.

11. The method of claim 10 including backfilling said trench beneath and about said pipeline and compacting said fill material by blowing said granular fill material into said trench simultaneously from opposite sides of said pipeline through a pair of laterally opposed vertically and longitudinally movable air ducts.

12. The method of claim 10 including pneumatically blowing said granular fill material into said trench progressively from the bottom of said trench below said pipeline progressively upwardly and simultaneously along the opposite sides of said pipeline from the bottom of said trench to at least about the spring line of said pipeline from opposite sides of said pipeline simultaneously under uniform blowing pressures so as to produce a substantially uniform high density compaction of said fill material from the bottom of said trench to approximately the level of said spring line.

* * * * *

UNITED STATES PATENT OFFICE
CERTIFICATE OF CORRECTION

Patent No. 4,068,488　　　　　　　　　Dated January 17, 1978

Inventor(s) D. Graham Ball

It is certified that error appears in the above-identified patent and that said Letters Patent are hereby corrected as shown below:

Column 5, line 40, between "of" and "pipeline" insert -- said --; line 47, claim 7, "blow" should read -- blown --; line 47, claim 7, between "along" and "pipeline" insert -- said --.

Signed and Sealed this

Second Day of May 1978

[SEAL]

Attest:

RUTH C. MASON　　　　　　　LUTRELLE F. PARKER
Attesting Officer　　　　　Acting Commissioner of Patents and Trademarks

Disclaimer

4,068,488.—*D. Graham Ball,* North Vancouver, Canada. METHOD OF BACKFILLING PIPELINE TRENCHES. Patented dated Jan. 17, 1978. Disclaimer filed July 31, 1981, by the assignee, *Rader Companies, Inc.*

Hereby enters this disclaimer to claims 3 and 6 of said patent.

[*Official Gazette October 13, 1981.*]